United States Patent
Ijaz

(10) Patent No.: US 12,047,326 B2
(45) Date of Patent: Jul. 23, 2024

(54) METHOD AND BASE STATION FOR TRANSMITTING DATA OF A TRANSPORT BLOCK

(71) Applicant: NEC Corporation, Tokyo (JP)

(72) Inventor: Ayesha Ijaz, Surrey (GB)

(73) Assignee: NEC CORPORATION, Tokyo (JP)

( * ) Notice: Subject to any disclaimer, the term of this patent is extended or adjusted under 35 U.S.C. 154(b) by 481 days.

(21) Appl. No.: 17/277,189

(22) PCT Filed: Sep. 11, 2019

(86) PCT No.: PCT/JP2019/035623
§ 371 (c)(1),
(2) Date: Mar. 17, 2021

(87) PCT Pub. No.: WO2020/066606
PCT Pub. Date: Apr. 2, 2020

(65) Prior Publication Data
US 2022/0060305 A1  Feb. 24, 2022

(30) Foreign Application Priority Data

Sep. 28, 2018  (GB) .................................... 1815910

(51) Int. Cl.
H04W 4/00 (2018.01)
H04L 5/00 (2006.01)
H04W 74/0808 (2024.01)

(52) U.S. Cl.
CPC ....... *H04L 5/0064* (2013.01); *H04W 74/0808* (2013.01)

(58) Field of Classification Search
CPC .......................... H04L 5/0064; H04W 74/0808
See application file for complete search history.

(56) References Cited

U.S. PATENT DOCUMENTS

| | | | |
|---|---|---|---|
| RE46,810 E * | 4/2018 | Jin | H04L 27/0008 |
| 2005/0013303 A1* | 1/2005 | Gopalakrishnan | H04L 1/1819 370/252 |
| 2008/0298477 A1* | 12/2008 | Classon | H04L 5/0053 455/509 |
| 2017/0215179 A1* | 7/2017 | Choi | H04W 16/14 |
| 2017/0303144 A1* | 10/2017 | Guo | H04B 17/318 |
| 2018/0092109 A1* | 3/2018 | Belghoul | H04B 7/0632 |

(Continued)

FOREIGN PATENT DOCUMENTS

| | | |
|---|---|---|
| EP | 3131225 A1 | 2/2017 |
| EP | 3361806 A1 | 8/2018 |

(Continued)

OTHER PUBLICATIONS

International Search Report for PCT Application No. PCT/JP2019/035623, mailed on Mar. 26, 2020.

(Continued)

*Primary Examiner* — Elisabeth Benoit Magloire

(57) ABSTRACT

A communication system is disclosed in which a base station performing listen-before-talk (LBT) and obtaining access during a shared channel occupancy time (COT) generates a transport block (TB) having a size corresponding to a full slot, and transmits the TB rate matched either to the symbols of a partial slot or to an aggregation of the symbols of a partial and a full slot.

12 Claims, 9 Drawing Sheets

(56) References Cited

U.S. PATENT DOCUMENTS

| | | | |
|---|---|---|---|
| 2018/0241499 A1 | 8/2018 | Einhaus et al. | |
| 2019/0007248 A1* | 1/2019 | Takeda | H04L 1/1861 |
| 2019/0268883 A1* | 8/2019 | Zhang | H04W 16/14 |
| 2019/0356451 A1* | 11/2019 | Zhang | H04W 72/23 |
| 2020/0059327 A1* | 2/2020 | Kini | H04L 1/1812 |
| 2020/0383108 A1* | 12/2020 | Lunttila | H04W 72/0446 |
| 2021/0051627 A1* | 2/2021 | Lee | H04W 72/12 |
| 2021/0092758 A1* | 3/2021 | Saito | H04W 72/0446 |
| 2022/0060305 A1 | 2/2022 | Ijaz | |

FOREIGN PATENT DOCUMENTS

| | | |
|---|---|---|
| JP | 2018-526895 A | 9/2018 |
| JP | 2022-500934 A | 1/2022 |
| WO | 2018/171898 A1 | 9/2018 |

OTHER PUBLICATIONS

Written opinion for PCT Application No. PCT/JP2019/035623, mailed on Mar. 26, 2020.

3GPP TS 38.211 V15.2.0, Technical Specification, 3rd Generation Partnership Project; Technical Specification Group Radio Access Network;NR;Physical channels and modulation, (Release 15), Jun. 2018.

3GPP TS 22.368 V13.1.0, Technical Specification, 3rd Generation Partnership Project; Technical Specification Group Services and System Aspects; Service requirements for Machine-Type Communications(MTC); Stage 1 (Release 13), Dec. 2014.

MCC Support. "Final Report of 3GPP TSG RAN WGl #91 v1.0.0 (Reno, USA, Nov. 27-Dec. 1, 2017)", 3GPP TSG RAN WG1 Meeting #92,Athens, Greece, Feb. 26-Mar. 2, 2018, R1-1801301.

Kazuaki Takeda et al, "Status Report to TSG: New Radio (NR) Access Technology", 3GPP TSG RAN meeting #77, Sapporo, Japan, Sep. 11-14, 2017, RP-171783.

JP Office Action for JP Application No. 2021-514441, mailed on May 31, 2022 with English Translation.

Media Tek Inc, "On frame structure design forNR-U operation", R1-1806271, 3GPP TSG RAN WG1 # Aug. 11, 94-2018, pp. 1-4.

LG Electronics, "Frame structure forNRunlicensedoperation", R1-1808504, 3GPP TSG RAN WG1 # Aug. 11, 94-2018, pp. 1-4.

Nokia, NokiaShanghai Bell, "On the remaining aspects of group-common PDCCH in NR", R1-1718603, 3GPP TSG RANWG1 #90 Oct. 2, b-2017, pp. 1-4.

JP Office Action for Japanese Patent Application No. 2022-210481, mailed on Jan. 23, 2024 with English Translation.

NEC, "Considerations on frame structure design for NR-U operation", 3GPPTSG RAN WG1 #94b R1-1810657, Internet<URL:http://www.3gpp.org/ftp/tsg_ran/WG1_RL1/TSGR1_94b/Docs/R1-1810657.zip>, Sep. 28, 2018.

Huawei, HiSilicon, "NR numerology and frame structure for unlicensed bands", 3GPP TSG RAN WG1 #94 R1-1808058, Internet<URL:http://www.3gpp.org/ftp/tsg_ran/WG1_RL1/TSGR1_94/Docs/R1-1808058.zip>, Aug. 10, 2018.

* cited by examiner

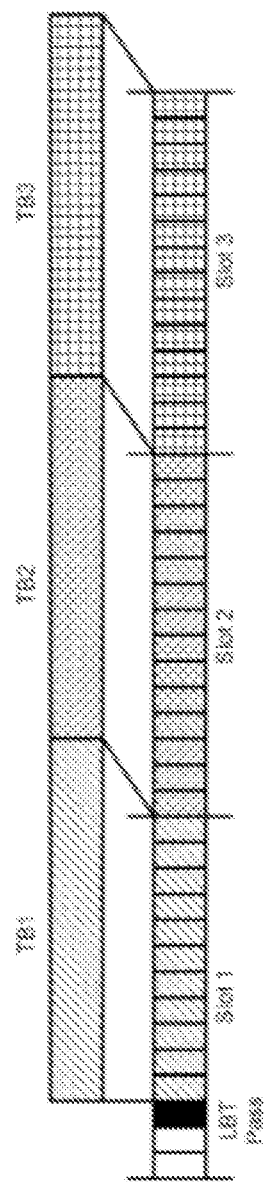
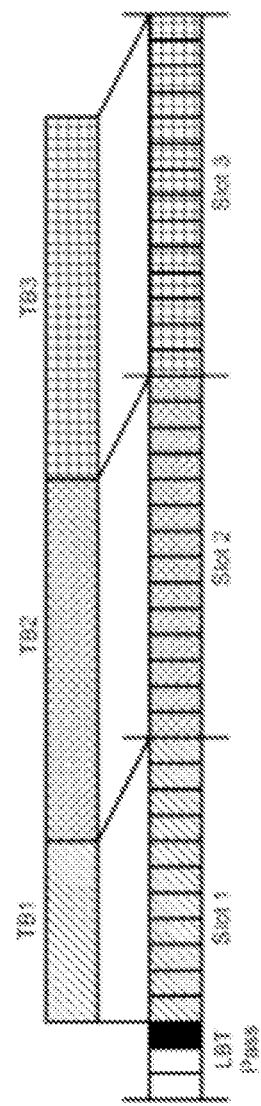
Figure 4 A
Figure 4 B

METHOD AND BASE STATION FOR TRANSMITTING DATA OF A TRANSPORT BLOCK

This application is a National Stage Entry of PCT/JP2019/035623 filed on Sep. 11, 2019, which claims priority from British Patent Application 1815910.3 filed on Sep. 28, 2018, the contents of all of which are incorporated herein by reference, in their entirety.

TECHNICAL FIELD

The present invention relates to a communication system. The invention has particular but not exclusive relevance to cellular communication system based access to unlicensed spectrum, and particularly but not exclusively to aspects of frame structure design, in the context of new radio (NR) based access to unlicensed spectrum (known as NR unlicensed or 'NR-U').

BACKGROUND ART

The invention has particular but not exclusive relevance to wireless telecommunications networks implemented according to various standards defined by the 3rd Generation Partnership Project (3GPP). For example, the invention has relevance to Long Term Evolution (LTE) networks, LTE Advanced (LTE-A) networks, related enhancements to and developments of LTE/LTE-A, and to the more recent development of communication technologies beyond LTE/LTE-A into so-called '5G' or 'new radio' (NR) technologies.

Under the 3GPP standards, a NodeB (or an 'eNB' in LTE, 'NR-BS' or 'gNB' in 5G) is base station of a RAN via which communication devices (user equipment or 'UE') connect to a core network and communicate with other communication devices or remote servers. Communication devices might be, for example, mobile communication devices such as mobile telephones, smartphones, user equipment, personal digital assistants, laptop/tablet computers, web browsers, e-book readers and/or the like. Such mobile (or even generally stationary) devices are typically operated by a user (although it is also possible to connect so-called 'Internet of Things' devices and similar machine-type communication devices to the network). For simplicity, the present application will use the term base station to refer to any such base stations and use the term mobile device or UE to refer to any such communication device. The core network (e.g. the EPC in case of LTE or the NGC in case of NR/5G) hosts functionality for subscriber management, mobility management, charging, security, and cal/session management (amongst others), and provides connection for communication devices to external networks, such as the Internet.

Before the development of 5G/NR technologies, the increased demand for wireless broadband data and the increasing need for yet further features that complemented the LTE/LTE-Advanced technology platforms led to unlicensed or 'public' spectrum (typically in the 5 GHz band) being considered as a potential source of further enhancements. Whilst the benefits of communication via unlicensed spectrum cannot currently compare to those provided via a licensed regime, the efficient use of unlicensed spectrum as a complement to the use of licensed spectrum was considered to have the potential to enhance significantly the overall service provided. The technique of using unlicensed 'public' spectrum, in combination with licensed spectrum, to augment provision via a licensed band is referred to as licensed-assisted access (or LAA).

Since the idea of using unlicensed spectrum as a complement to licensed spectrum was first conceived, there has been significant progress in the development of the technology with the introduction of a number of LAA and enhanced LAA (eLAA) features.

With the evolution of cellular technology as part of the 5G/NR developments, and the related development of a wider bandwidth waveform, consideration is being given to incorporating the LAA/eLAA features into 5G/NR. This has been referred to as "NR-based access to unlicensed spectrum".

NR-based unlicensed access, with undertying unlicensed band component carriers (CCs) with wider bandwidth (e.g., 80 or 100 MHz) also has the potential to reduce the implementation complexity for both eNB and UE (compared to carriers of smaller bandwidth, when moving to address larger amount of spectrum).

In line with NR development, and in order to maximize the applicability of NR-based unlicensed access, solutions applicable to sub-6 Hz and above 6 GHz unlicensed bands (e.g., 5 GHz, 37 GHz, 60 GHz) are being studied. Similarly scenarios and solutions are being studied where NR-LAA is anchored to a legacy LTE carrier by dual-connectivity (DC) similar to the non-standalone (NSA) mode of regular NR operation, as well as carrier aggregation (CA) based aggregation with a 5G NR anchor. Furthermore, it is beneficial to consider standalone operation of NR in unlicensed spectrum at an early stage and the study should address this.

In most countries, regulatory requirements exist which seek to minimize the potential interference between users of the unlicensed spectrum. Even where regulatory requirements are not particularly strict the fair coexistence between LTE and other technologies such as Wi-Fi is considered necessary. It is not, therefore, enough to minimize interference simply to meet regulatory requirements—it is also important that a deployed system will operate as a "good neighbour" and not, therefore, significantly impact other users of the unlicensed spectrum.

One mechanism for coexistence is the so called 'listen-before-talk' (LBT) mechanism, which governs when communication equipment may access a channel on an unlicensed band. For example, according to the European regulations for load-based equipment, clear channel assessment (CCA) (also referred to as channel sensing, 'CS') must be performed prior to starting a new transmission. CCA involves listening to the communication channel to determine whether it is occupied before transmitting on that channel. An extended CCA may be performed if, on listening to the channel, the communication medium is determined to be occupied during the initial CCA, and transmission is then postponed until the channel is considered clear. After a base station or UE has gained access to a channel, the base station or UE is only allowed to transmit for a limited duration (channel occupancy time (COT)), referred to as the maximum COT (MCOT).

More recently the concept of COT sharing has been introduced which is a mechanism in which, when a device has acquired a COT following successful LBT another device can share it, using a 25 µs LBT with a gap (provided the overall amount of transmission does not exceed the MCOT limit). For example, for 5G/NR it has been decided that single and multiple DL to UL and UL to DL switching points within a shared gNB COT should be supported although detailed LBT requirements to support single or multiple switching points still need to be identified. For a switching gap of less than 16 us a so-called 'no-LBT' option can be used although restrictions/conditions on when no- LBT option can be used are still to be identified, in consideration of fair coexistence. For gap between 16 us and 25 us a one-shot LBT (as opposed to Cat4 LBT with back-off) can be used although restrictions/conditions on precisely when the one-shot LBT option can be used are still to be identified, in consideration of fair coexistence. For a single switching point, when the gap from DL transmission to UL transmission exceeds 25 us one-shot LBT is to be used although it is still to be established how many one-shot LBT attempts are allowed for a granted UL transmission.

However the introduction of LAA to 5G/NR communication networks (and potentially similar networks using non-LTE technology) presents a number of challenges and introduces potential conflicts with existing technology that will have to be resolved before such technology can be deployed successfully.

[Math. 1]

NR supports multiple different numerologies (subcarrier spacing (SCS) and Orthogonal frequency-division multiplexing (OFDM) symbol lengths) which are summarised in the 3GPP technical standard TS38.211. Contrastingly, in LTE there is only a single (15 kHz) SCS. In NR each numerology is identified by a parameter, $\mu$, where $\mu=0$ represents the 15 kHz LTE. Currently, the SCS for other values of $\mu$ can, in effect, be derived from $\mu=0$ by scaling up in powers of 2 (i.e. SCS=15×2$^\mu$ kHz). The current relationship in NR between the parameter, $\mu$, and SCS ($\Delta f$) is shown in Table 4.2.1 of TS38.211 as follows:

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

[Math. 2]

In NR slot length also varies depending on numerology with a general tendency for slot length to get shorter with increasing SOS (for a normal cyclic prefix, slot length=½$^\mu$ ms; slots per subframe=2$^\mu$; and slots per frame=10×2$^\mu$). The current relationship in NR, for normal cyclic prefixes, between the parameter, $\mu$, slots per frame ($N_{slot}^{frame,\mu}$) and slots per subframe ($N_{slot}^{subframe,\mu}$) is shown in Table 4.3.2-1 of TS38.211 as follows:

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

FIG. 1 illustrates different slot lengths for different NR numerologies (for $\mu=0$, $\mu=1$, and $\mu=2$).

A slot can be complemented by so-called 'mini-slots' to support transmissions with a flexible start position and a duration shorter than a regular slot duration. Originally it was intended that a mini-slot could be as short as one symbol and could, in theory, start at any time. However, only the three lengths of OFDM symbols (2, 4 and 7) were ultimately specified.

Mini-slots can be particularly useful in a number of scenarios including, for example, transmissions in unlicensed spectrum.

With LBT, however, due to the random nature of the transmission opportunities, implementing schedule based transmission is quite challenging.

For example, when transmitting in unlicensed spectrum, it is beneficial to start transmission a soon as possible after LBT. Specifically, once a base station has obtained transmission opportunity (TXOP) via LBT, the base station should be able to start downlink (DL) control transmission (e.g. in a physical downlink control channel (PDCCH)) and/or downlink data transmission (e.g. in a physical downlink shared channel (PDSCH)) at any symbol in a slot for efficient channel utilization and to avoid losing the channel.

SUMMARY OF INVENTION

However, the remaining length of a 'partial' slot following a successful LBT cannot be known in advance. Accordingly, the mapping of transport blocks (TBs) carrying downlink data (i.e. the payload of the shared channel) to the partial slot is a challenge because the size a TB needs to be to ensure successful transmission within the remainder of the slot cannot be known in advance.

Whilst, hypothetically, data could be partitioned into TBs, and the corresponding code word encoding updated dynamically ('on the fly') following successful LBT, i.e. based on the slot length remaining once it is known, this would likely result in increased transmitter complexity and cost in order to ensure that the timing requirements could be met.

Alternatively, since there may not be enough time for packet generation between the end of LBT and the start of PDSCH transmission, another possibility is to prepare multiple PDSCHs with various lengths at the base station, prior to the successful completion of LBT, and to transmit the PDSCH having the length that is most compatible with the remaining partial slot length after LBT success. However, this option also increases the processing burden placed on the base station.

Moreover, since the UE does not know the start position of the DL transmission the flexible starting position in NR-U means that in order for a UE to blindly detect the Control Resource Set (CORESET) transmitted via a corresponding PDCCH, the UE will have to monitor every possible CORESET occasion, in every slot. This has the potential to increase a UE's complexity and power consumption significantly.

The present invention seeks to provide methods and associated apparatus that support or improve upon the current proposals/agreements relating to NR-U.

In particular, examples are described related to (but not limited to) aspects of frame structure design for NR-U operation, including DL flexible transmission start points, transmission detection, and indication for COT structure.

In one example aspect of the invention there is provided a method performed by a base station of a communication system in which downlink and uplink communications are organised, in time, into a sequence of subframes, each subframe comprising at least one respective slot, each slot comprising a plurality of symbols, the method comprising: performing a listen-before-talk, LBT, procedure for gaining access to unlicensed spectrum; when, as a result of said LBT procedure, the base station gains access to the unlicensed spectrum during a current slot: preparing a transport block, TB, comprising data for transmission to a user equipment, UE; determining an effective code rate that will be expected if the TB is rate matched to remaining symbols in the current slot; and transmitting the data of the TB, based on the determined effective code rate, wherein: the data of the TB is transmitted using a first set of symbols when the determined effective code rate meets a criterion; and the data of the TB is transmitted using second set of symbols that is different to the first set of symbols otherwise.

One of said first set of symbols and said second first set of symbols may comprise remaining symbols of the current slot and the other one of said first set of symbols and said second first set of symbols may comprise an aggregation of both the remaining symbols of the current slot and all the symbols of a subsequent slot.

The TB may be prepared to have a transport block size, TBS, that corresponds to all the symbols of a full sized slot. The TB may be prepared to have a transport block size, TBS, that corresponds to the symbols of a partial slot (or mini-slot) comprising a predetermined number of symbols of a full sized slot.

The transmitting of the data of the TB may comprise: rate matching the data of the TB to the first set of symbols when the determined effective code rate meets the criterion; and rate matching the data of the TB to the second set of symbols otherwise. Determination of whether the determined effective code rate meets the criterion may be based on a comparison of the determined effective code with a target code rate. Determination of whether the determined effective code rate meets the criterion may be based on a comparison of the determined effective code with a sum of the target code rate and a threshold (e.g. a code rate variation threshold). Determination of whether the determined effective code rate meets the criterion may be based on whether the determined effective code is no greater than (or simply less than) the sum of the target code rate and the threshold (e.g. a code rate variation threshold). Determination of whether the determined effective code rate meets the criterion may be based on whether the determined effective code is no less than (or simply greater than) the sum of the target code rate and the threshold (e.g. a code rate variation threshold). The threshold may be a code rate variation threshold. The threshold may be pre-configured at the base station or may be calculated at the base station dynamically when required. The threshold may, for example, by calculated based on a statistical average of a received signal-to-noise ratio, SNR, at the base station over a period of time.

In one example aspect of the invention there is provided a method performed by a base station of a communication system, the method comprising: obtaining an uplink/downlink, UL/DL, slot configuration to be used during a shared channel occupancy time, COT; and providing to at least one user equipment, UE, an indication of the UL/DL slot configuration; wherein said indication of the UL/DL slot configuration comprises a bitmap where individual bits of the bitmap are set to represent the UL/DL slot configuration.

The UL/DL slot configuration may be provided using a group common physical downlink control channel, GC-PDCCH. The method may further comprise identifying that a change has occurred in the UL/DL slot configuration and providing to the at least one UE, in response to said change, an updated indication of the changed UL/DL slot configuration comprising a modified bitmap represent the changed UL/DL slot configuration.

The base station may be a 5G/NR base station or gNB. The communication system may be a 5G/NR communication system.

In one example aspect of the invention there is provided a method performed by a user equipment, UE, of a communication system, the method comprising: receiving, from a base station, an indication of an uplink/downlink, UL/DL, slot configuration to be used during a shared channel occupancy time, COT, wherein said indication of the UL/DL slot configuration comprises a bitmap where individual bits of the bitmap are set to represent the UL/DL slot configuration; and monitoring for downlink control information based on said UL/DL slot configuration.

In one example aspect of the invention there is provided a base station for a communication system in which downlink and uplink communications are organised, in time, into a sequence of subframes, each subframe comprising at least one respective slot, each slot comprising a plurality of symbols, the base station comprising: means for performing a listen-before-talk, LBT, procedure for gaining access to unlicensed spectrum; means for preparing data for transmission to a user equipment, UE; means for determining an effective code rate; wherein when, as a result of said LBT procedure, the base station gains access to the unlicensed spectrum during a current slot: the means for preparing is configured to prepare a transport block, TB, comprising data for transmission to a user equipment, UE; and the means for determining means for determining is configured to determine an effective code rate that is expected if the TB is rate matched to remaining symbols in the current slot; and means for transmitting the data of the TB, based on the determined effective code rate, wherein: the data of the TB is transmitted using a first set of symbols when the determined effective code rate meets a criterion; and the data of the TB is transmitted using second set of symbols that is different to the first set of symbols otherwise.

In one example aspect of the invention there is provided a base station for a communication system, the base station comprising: means for obtaining an uplink/downlink, UL/DL, slot configuration to be used during a shared channel occupancy time, COT; and means for providing to at least one user equipment, UE, an indication of the UL/DL slot configuration; wherein said indication of the UL/DL slot configuration comprises a bitmap where individual bits of the bitmap are set to represent the UL/DL slot configuration.

In one example aspect of the invention there is provided a user equipment, UE, for a communication system, the UE comprising: means for receiving, from a base station, an indication of an uplink/downlink, UL/DL, slot configuration to be used during a shared channel occupancy time, COT, wherein said indication of the UL/DL slot configuration comprises a bitmap where individual bits of the bitmap are set to represent the UL/DL slot configuration; and means for monitoring for downlink control information based on said UL/DL slot configuration.

In one example aspect of the invention there is provided a base station for a communication system in which downlink and uplink communications are organised, in time, into a sequence of subframes, each subframe comprising at least one respective slot, each slot comprising a plurality of symbols, the base station comprising: a controller and transceiver circuitry; wherein the controller is configured to control the transceiver circuitry to perform a listen-before-talk, LBT, procedure for gaining access to unlicensed spectrum; wherein the controller is configured, when the base station gains access to the unlicensed spectrum during a current slot: to prepare a transport block, TB, comprising data for transmission to a user equipment, UE; and to determine an effective code rate that is expected if the TB is rate matched to remaining symbols in the current slot; and wherein the controller is configured to control the transceiver circuitry to transmit the data of the TB, based on the determined effective code rate; wherein the data of the TB is transmitted using a first set of symbols when the determined effective code rate meets a criterion, and the data of the TB is transmitted using second set of symbols that is different to the first set of symbols otherwise.

In one example aspect of the invention there is provided a base station for a communication system, the base station comprising: a controller and transceiver circuitry; wherein the controller is configured obtain an uplink/downlink, UL/DL, slot configuration to be used during a shared channel occupancy time, COT; and to control the transceiver circuitry to provide to at least one user equipment, UE, an indication of the UL/DL slot configuration; wherein said indication of the UL/DL slot configuration comprises a bitmap where individual bits of the bitmap are set to represent the UL/DL slot configuration.

In one example aspect of the invention there is provided a user equipment, UE, for a communication system, the UE comprising: a controller and transceiver circuitry; wherein the controller is configured to control the transceiver circuitry to receive, from a base station, an indication of an uplink/downlink, UL/DL, slot configuration to be used during a shared channel occupancy time, COT, wherein said indication of the UL/DL slot configuration comprises a bitmap where individual bits of the bitmap are set to represent the UL/DL slot configuration; and wherein the controller is configured to control the transceiver circuitry to monitor for downlink control information based on said UL/DL slot configuration.

Example aspects of the invention extend to computer program products such as computer readable storage media having instructions stored thereon which are operable to program a programmable processor to carry out a method as described in the example aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Example embodiments of the invention will now be described by way of example only with reference to the attached figures in which:

FIG. 4A illustrates a number of options for supporting a flexible PDSCH starting position in the context of NR-U;

FIG. 4B illustrates a number of options for supporting a flexible PDSCH starting position in the context of NR-U;

DESCRIPTION OF EMBODIMENTS

Overview

Figure 1:
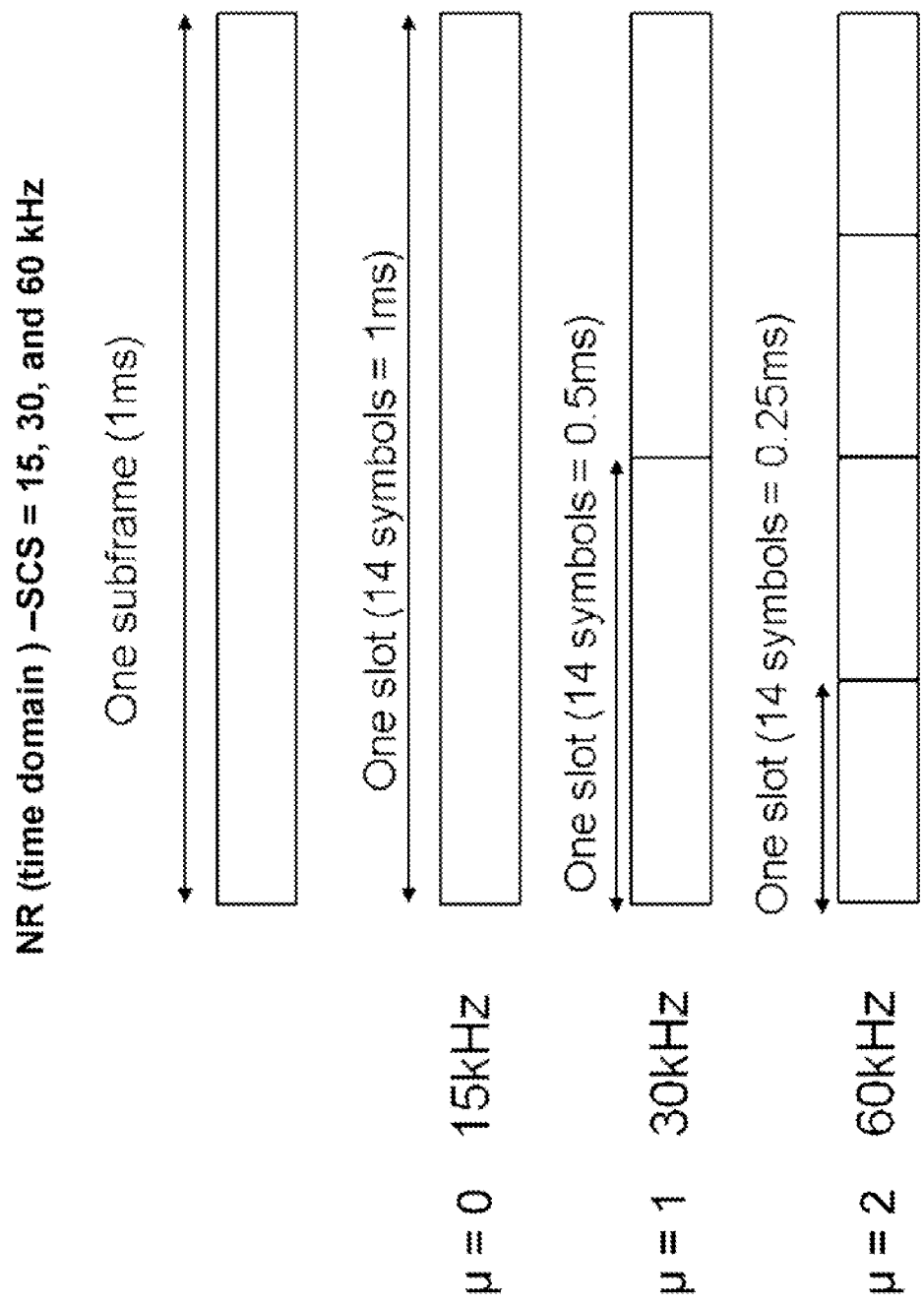
FIG. 1 illustrates different slot lengths for different new radio numerologies.
Figure 2:
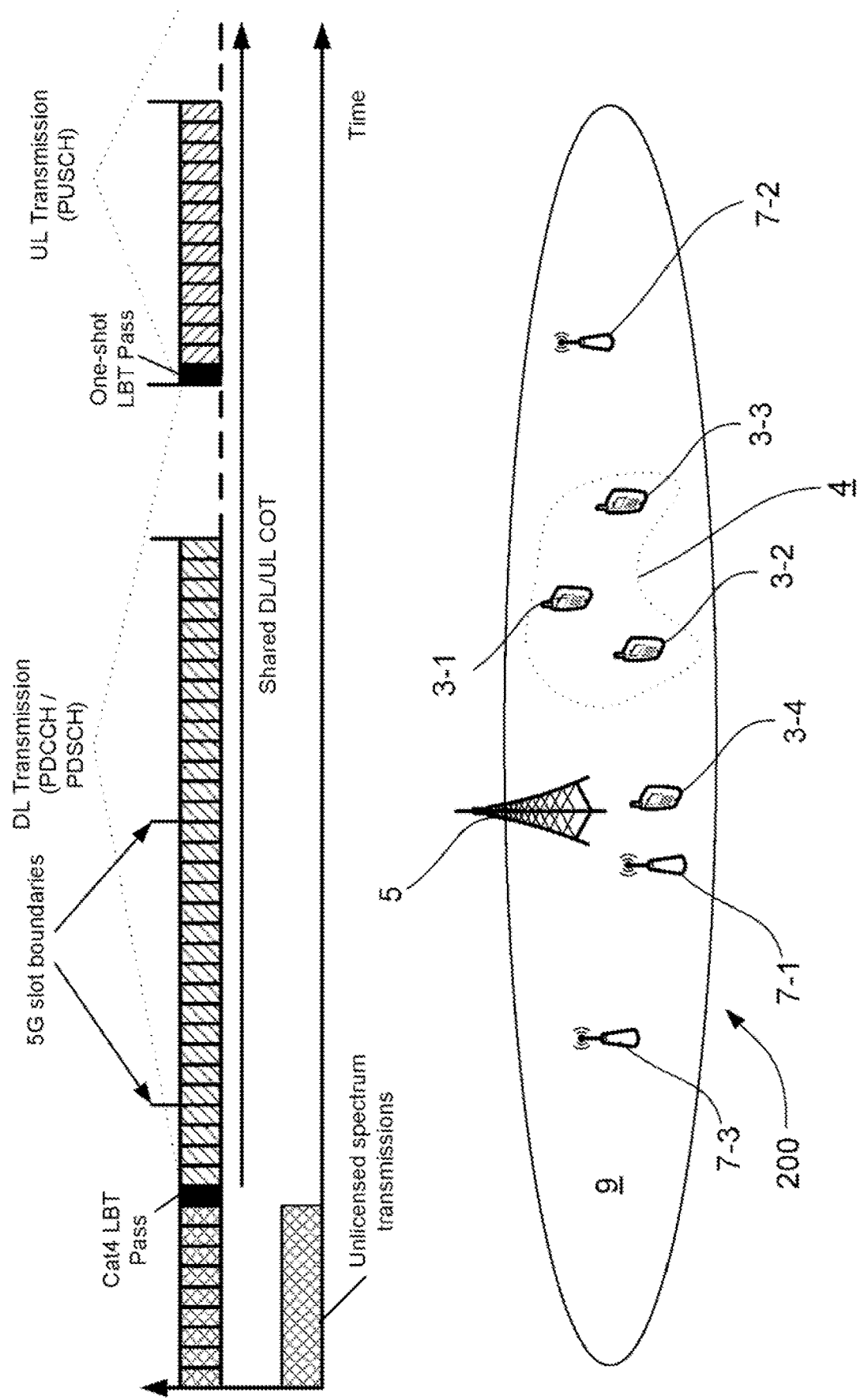
FIG. 2 schematically illustrates a telecommunication network.

FIG. 2 schematically illustrates a telecommunication network 200 in which items of user equipment (UEs) 3-1 to 3-4 (mobile telephones and/or other communication devices) can communicate with each other via a radio access network (RAN) node 5. In the illustrated example, the RAN node 5 comprises a NR/5G base station or 'gNB' 5 operating an associated cell 9. Communication via the base station 5 is typically routed through a core network (e.g. a 5G core network or evolved packet core network (EPC) not shown) which is accessed using an appropriate radio access technology (RAT). Also operating within the vicinity of the base station 5 are a number of unlicensed band transceiver nodes 7-1 to 7-3 each of which operates in unlicensed spectrum (e.g. in a sub-8 GHz band such as 5 GHz and/or an above 6 GHz band such as 37 GHz or 60 GHz). As those skilled in the art will appreciate, whilst several UEs 3-1 to 3-4, one base station 5 and three unlicensed band transceiver nodes 7-1 to 7-3 are shown in FIG. 1 for illustration purposes, the system, when implemented, will typically include other base stations, unlicensed band transceiver nodes 7 and UEs 3.

The base station 5 and UEs 3 are each configured to operate in accordance with the corresponding standards (in this example the 3GPP standards relating to new radio (NR)/5G). For example, the base station 5 transmits to a UE 3 using downlink (DL) channels such as the physical downlink control channel (PDCCH) and the physical downlink shared channel (PDSCH) and receives from a UE 3 using uplink (UL) channels such as the physical uplink control channel (PUCCH) and the physical uplink shared channel (PUSCH). The base station 5 is also able to transmit control date to groups 4 of UEs using the so-called group common PDCCH (GC-PDCCH).

The base station 5 and UEs 3 are also configured to employ NR based access to unlicensed spectrum (i.e. NR unlicensed or 'NR-U').

Specifically when the base station 5 has data to transmit it performs a LBT procedure in respect of the unlicensed band. The LBT procedure may be any suitable procedure such as, for example, an LBT Cat 4 procedure in which the device conducts an initial clear channel assessment (iCCA), where it is checked if the channel is idle for a defined period of time. If the channel is determined to be free, the transmission can proceed. If not, the device conducts a slotted random back-off procedure, where a random number is selected from a specified interval called the contention window. A back-off countdown is done whenever the channel is determined to be free and the transmission is initiated when the back-off counter goes to zero.

As seen in FIG. 2, when the channel in the unlicensed band is assessed to be clear and a transmission opportunity (TXOP) is obtained the base station 5 can begin downlink signalling for the duration of a channel occupancy time (COT). This downlink signalling will typically comprise control data (such as the Control Resource Set (CORESET)) in a PDCCH and user data in a PDSCH.

The base station 5 and UEs 3 are configured to share the COT (within an overall maximum COT (MCOT)) for a given UL/DL configuration. Accordingly, when transmission is switched from UL to DL a one-shot LBT (or 'no-LBT' option depending on the switching gap) may be employed prior to commencing UL transmission (e.g. PUSCH) transmission.

Figure 5:
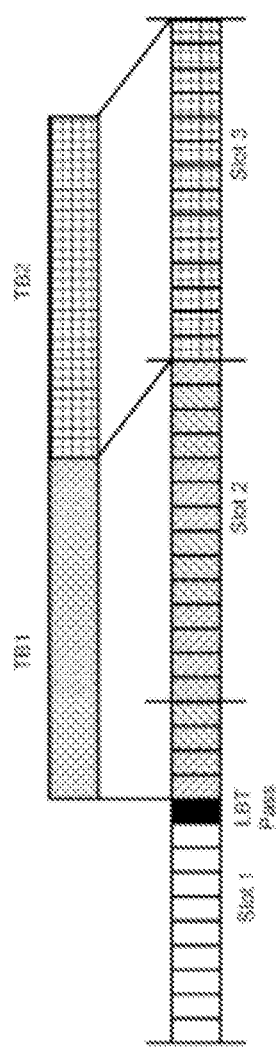
FIG. 5A illustrates a number of options for supporting a flexible PDSCH starting position in the context of NR-U.
FIG. 5B illustrates a number of options for supporting a flexible PDSCH starting position in the context of NR-U.
Figure 5:
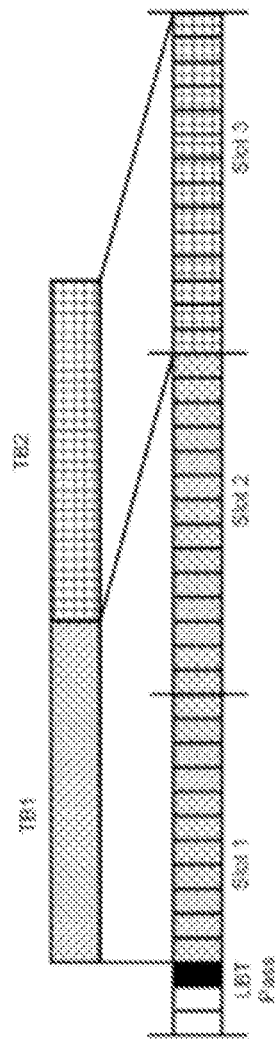

It will be appreciated that the LBT procedure may be successful partially through a slot as illustrated in FIG. 2 and hence the starting position, within a slot, for PDSCH transmission may vary. There are a number of options for supporting such a flexible PDSCH starting position. A number of these are illustrated in FIGS. 3 to 5.

Figure 3A:
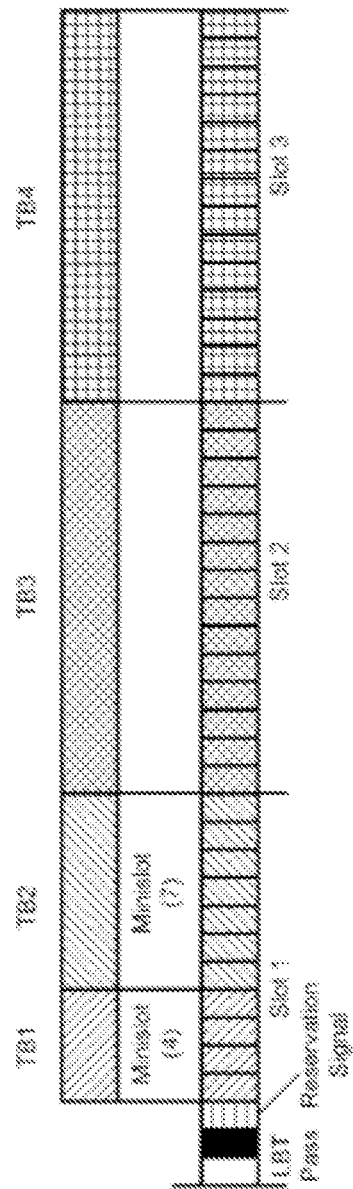
FIG. 3A illustrates a number of options for supporting a flexible PDSCH starting position in the context of NR-U.

Referring to FIG. 3, for example, this illustrates an option in which DL transmission is supported at fixed-length minislot boundaries only (e.g. 4 symbol and 7 symbol boundaries). In FIG. 3A for example, there are 12 symbols available for transmission in a partial slot before the first full slot. Accordingly two smaller sized transport blocks (TB1 and TB2) are prepared and transmitted in the partial slot, the first corresponding to a 4 symbol mini-slot and the second corresponding to a 7 symbol mini-slot, before full size transport blocks are transmitted (TB3, TB4 etc.) in the full slots.

Figure 3B:
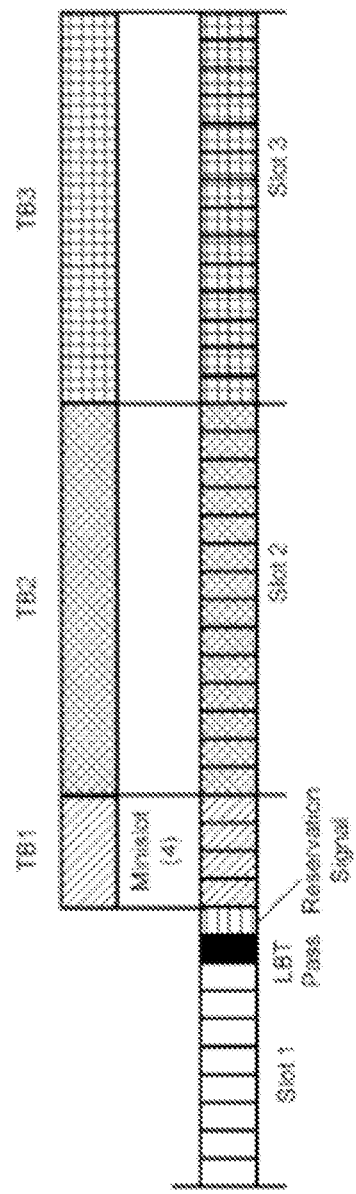
FIG. 3B illustrates a number of options for supporting a flexible PDSCH starting position in the context of NR-U.

In FIG. 3B, on the other hand, there are only 5 symbols available for transmission in a partial slot before the first full slot. Accordingly a single smaller transport blocks (TB1) is prepared and transmitted in the partial slot corresponding to a 4 symbol mini-slot.

To avoid losing channel to other incumbent users if the end of successful LBT does not align with the mini-slot boundary (as seen in FIGS. 3(a) and (b)), a reservation signal can be transmitted by the base station until the start of the next mini-slot.

However, this approach has the disadvantage that it can cause waste of spectral resources due to reservation signal transmission, higher control channel and demodulation reference signal (DMRS) overhead and increased DL control channel blind decoding burden on the UE side. Moreover, smaller transport blocks experience extra a performance penalty as compared to larger transport blocks.

Another option (not illustrated) is to support minimumlength (2 OFDM symbol) mini-slot based transmission granularity and to effectively fill up the partial slot following successful LBT and to support slot-level granularity from the next slot boundary. This approach has the potential to reduce overhead compared to the previous option.

FIGS. 4A and 4B illustrate another option in which the transport block size is determined according to a full slot length (FIG. 4A)—or possibly a half slot length (FIG. 4A)—and then rate matching of the encoded data is applied to match the transport block (PDSCH) transmission to the remaining resources available in the partial slot. This approach has the potential to reduce the overhead compared to both the above options, albeit at the potential expense of a higher effective code rate than a targeted code rate.

It will be appreciated that rate matching in the PDSCH by which the number of bits in a transport block (TB) is effectively matched to the number of bits that can be transmitted in the given set of resources.

FIGS. 5A and 5B illustrate another option in which the transport block size is determined according to a full slot length. The remaining resources in the partial slot are, however, effectively treated as aggregated with those in the subsequent full slot. Rate matching of the encoded data is then performed to match the transport block (PDSCH) transmission to the resources of the aggregated slots. This approach has the potential to at least partially alleviate the higher overhead and higher effective code rate issues associated with the above options.

However, whilst the option of FIGS. 5A and 5B may appear to be the most suitable, and to increase likelihood of successful decoding due to lower effective code rate, it also has the potential to cause spectral efficiency loss. This is especially the case if, as illustrated in FIG. 5B the partial slot is not significantly shorter than the full slot length.

Accordingly whilst the base station 5 could employ any of the above options, in this example, the base station 5 employs a particularly beneficial and flexible mechanism that mitigates the spectral efficiency loss. Specifically, as described in more detail later, to support a flexible starting position for the downlink PDSCH following successful LBT, which helps to minimise the processing burden at the base station 5, the base station 5 employs a hybrid approach in which transport block size determination is based on a full slot. However, the encoded data is rate matched to a partial slot (e.g. as illustrated in FIGS. 4A and 4B) if the difference between effective and target code rate is within a certain threshold. Otherwise, the encoded data is rate matched to resources of an aggregated partial and full slot (e.g. as illustrated in FIGS. 5A and 5B).

The threshold is referred to as a code rate variation threshold $\Delta_{CR,th}$. If the effective code rate in partial slot after successful LBT is determined to be no greater than a given target code rate+$\Delta_{CR,th}$ then the encoded data is rate matched to the resources available in the partial slot only. Otherwise (i.e. if the effective code rate in partial slot after successful LBT is determined to be greater than the target code rate+$\Delta_{CR,th}$) then the encoded data is rate matched to the resources available in the aggregated slots (partial slot and subsequent full slot).

As explained in the introduction, flexible starting position in NR-U poses a challenge for the UE to blindly detect CORESET. However, the base station 5 and UE 3 of this example employs a procedure to avoid high complexity, blind PDCCH detection by implementing an alternative low complexity DL transmission detection mechanism.

Specifically, the base station 5 is configured to provide an initial/wakeup signal to identify the start of downlink transmission in NR-U. Specifically, an initial/wakeup burst identification signal is sent to indicate start of downlink transmission. The UE 3 is configured to detect the initial/wakeup burst and to trigger CORESET monitoring on detection of this trigger signal. Any suitable design of burst identification signal may be used for example a preamble transmission, a cell specific identification signal, DMRS, Primary/Secondary Synchronisation Signals (PSS/SSS), Channel State Information Reference Signal (CSI-RS), PDCCH DMRS (wideband) etc.

The base station 5 is also beneficially configured to provide, to the UEs 3, a dynamic indication of the UL/DL configuration of the slot structure within the duration of the MCOT.

Providing such an indication to the UE 3 provides for reduced UE power consumption by allowing the UE 3 to monitor DL control information in the DL portion(s) only (i.e. instead of every slot in the MCOT). Providing such an indication to the UE 3 also allows for the precise determination of transmission/reception timing for periodic DL/UL signalling (such as, for example, signalling of the synchronization signal block (SSB) comprising related signalling components (e.g. PSS, SSS, PBCH DMRS, PBCH or the Ike), signalling related to the physical random access channel (PRACH) procedure and configured grant, fine channel tracking etc. The provision of a dynamic indication of the UL/DL configuration for the MCOT is particularly useful because the MCOT structure can vary frequently due to the uncertainty regarding the result of LBT and the local interference environment.

Beneficially, the base station 5 is configured to indicate the UL/DL configuration only when the configuration is changed by the base station 5—thus overriding a previously configured slot structure.

Specifically, as described in more detail with reference to FIG. 9, in order to dynamically configure UL/DL resource configuration in a slot (without having to preconfigure a potentially large set of slot formats at the UE), the base station 5 is configured (whenever there is a change in the slot configuration) to generate a bitmap representing the UL/DL configuration of each symbol in each slot (e.g. with each bit corresponding to a symbol and set to 1 or 0 to respectively represent UL or DL—or vice versa). The bitmap, once generated, is then transmitted in a GC-PDCCH to a group 4 of one or more UEs to indicate the UL/DL configuration of each symbol in each slot in a number of slots. The UEs 3 of the group 4, on receiving the bitmap, can thus determine when downlink transmissions are to be expected and thus when to monitor for control information (e.g. the CORESET). On detection of a subsequent GC-PDCCH with a new bitmap, the previous configuration can be overridden.

It can be seen, therefore, that the communication system described has a number of beneficial features. For example, the communication system provides for a mechanism for generating transport blocks and transmitting them in a PDSCH which allows for the flexible starting positions of PDSCH, in the context of NR-U, whilst minimising the impact on the processing burden at the base station. This mechanism also has the potential to provide a reasonable balance between, on the one hand, issues associated with signalling overhead and high effective code rates and, on the other hand, issues associated with spectral efficiency loss.

The communication system also provides a particularly flexible mechanism for indicating the UL/DL configuration of the MCOT (at the granularity of each symbol in each slot within a number of slots) that allows for any UL/DL configuration without requiring a large set of preconfigured configurations to be setup at the UE.

User Equipment

Figure 6:
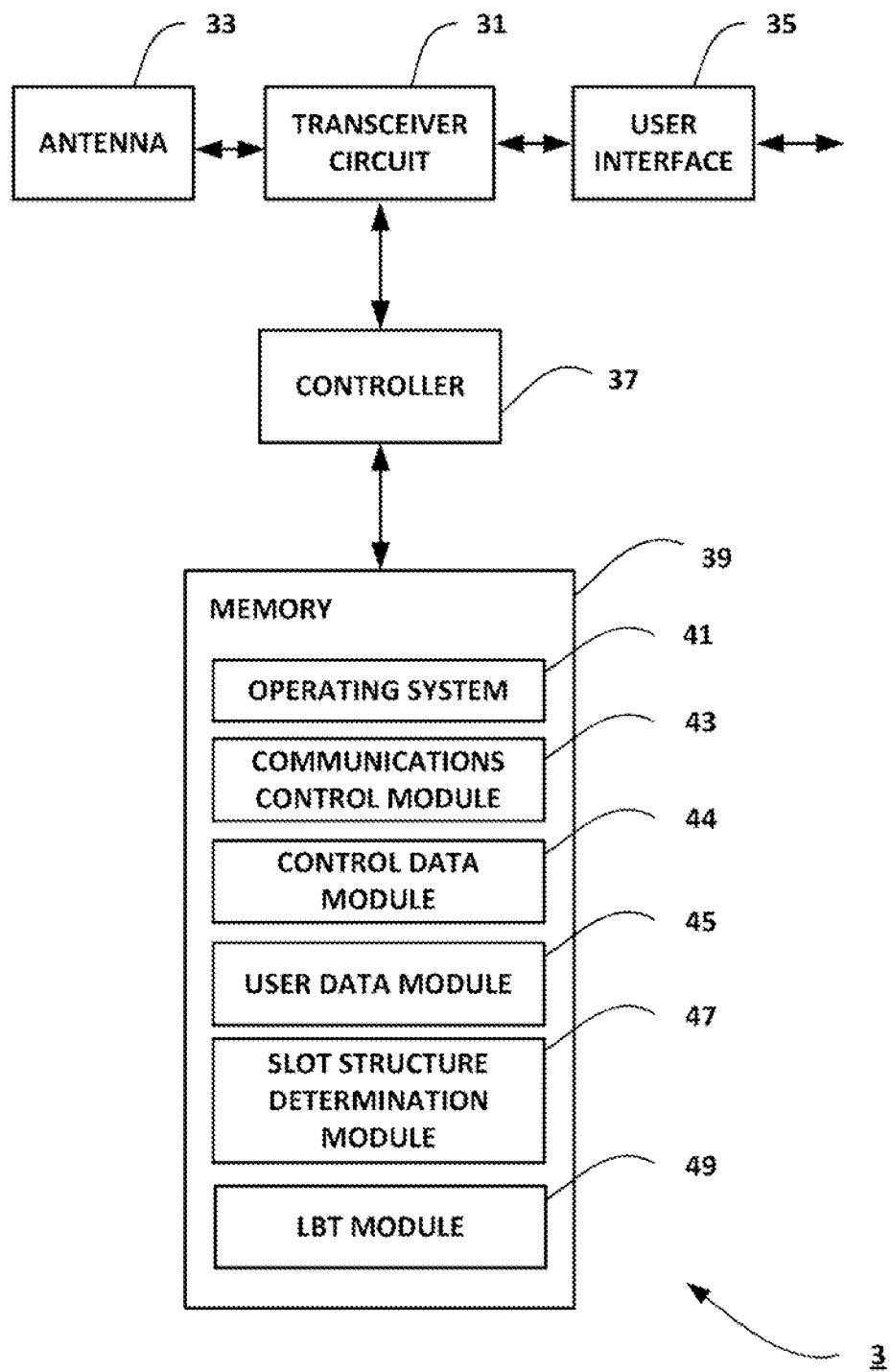
FIG. 6 is a simplified block diagram illustrating the main components of a UE.

FIG. 6 is a block diagram illustrating the main components of the UE 3 shown in FIG. 2 (e.g. a mobile telephone or other user equipment). As shown, the UE 3 has a transceiver circuit 31 that is operable to transmit signals to and to receive signals from a base station 5 via one or more antenna 33.

The UE 3 has a controller 37 to control the operation of the UE 3. The controller 37 is associated with a memory 39 and is coupled to the transceiver circuit 31. Although not necessarily required for its operation, the UE 3 might of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 controls overall operation of the mobile device 3 by, in this example, program instructions or software instructions stored within memory 39. As shown, these software instructions include, among other things, an operating system 41, a communications control module 43, a control data module 44, a user data module 45, a slot structure determination module 47 and an LBT module 49.

The communications control module 43 controls the overall communication between the UE 3 and the base station 5.

The control data module 44 manages the monitoring for, and the reception and decoding of, DL control data transmitted by the base station 5 to the UE 3 (for example control data transmitted on the PDCCH, GC-PDCCH and/or other similar control channels such as the E-PDCCH/M-PDCCH). The control data module 44 also manages the encoding and transmission of UL control data to the base station 5 (e.g. ACK/NACK signalling on the PUCCH and/or RACH related signaling during PRACH procedures).

The user data module 45 manages the reception and decoding of DL user data transmitted by the base station 5 to the UE 3 (for example user data transmitted on the PDSCH or the Ike). The user data module 45 also manages the encoding and transmission of UL user data to the base station 5 (e.g. user data transmitted on the PUSCH or the Ike).

The slot structure determination module 47 determines, from any slot structure indications received from the base station (e.g. a slot structure indication bitmap provided in the GC-PDCCH), the slot structure during a given MCOT and informs the control data module 43 accordingly to allow the control data module 43 to monitor for downlink control data at the appropriate timings.

The LBT module 49 manages the performance, at the UE 3, of clear channel assessment (CCA)/channel sensing (CS) necessitated by LBT requirements.

RAN Node

Figure 7:
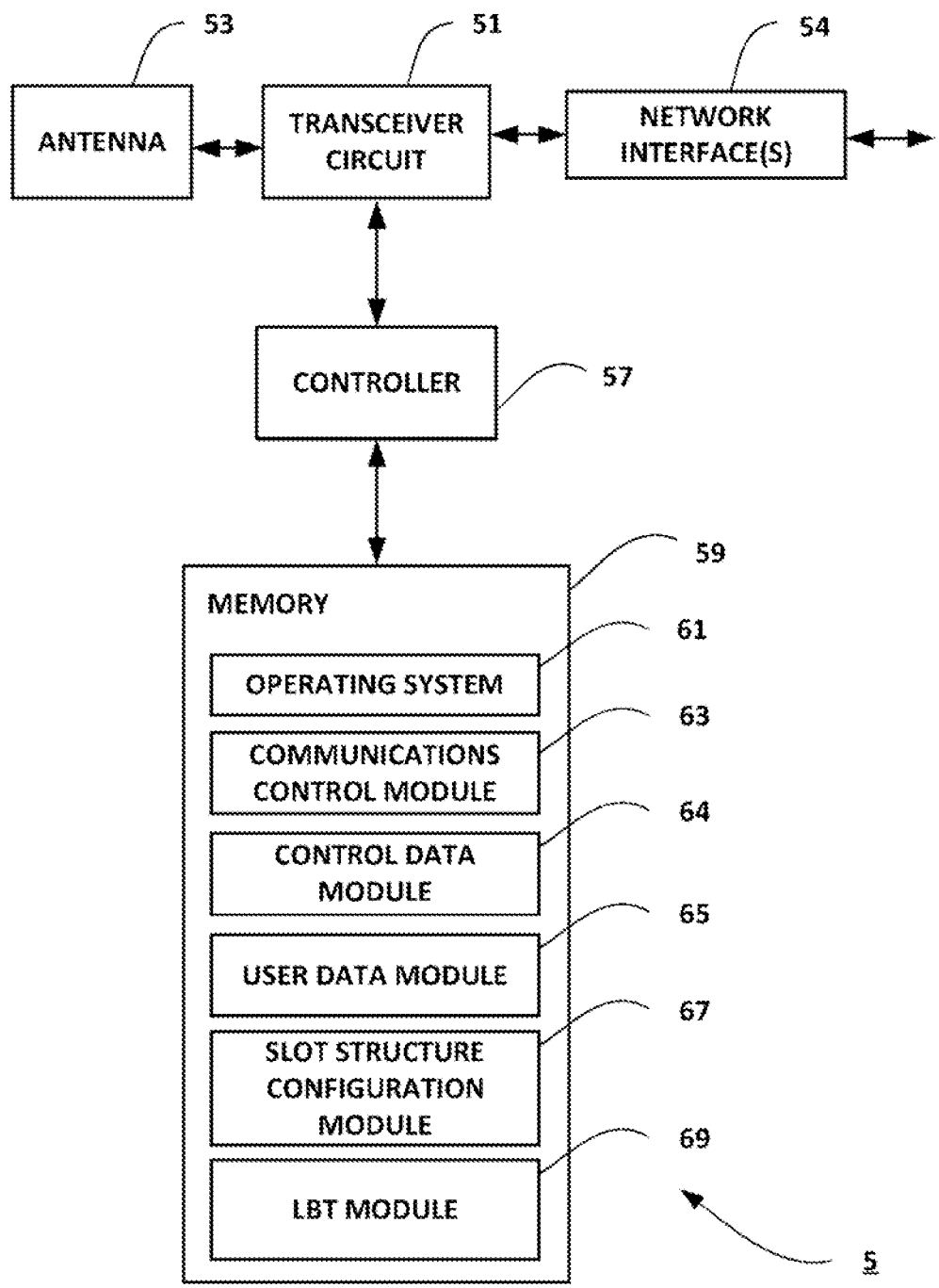
FIG. 7 is a simplified block diagram illustrating the main components of a base station.

FIG. 7 is a block diagram illustrating the main components of a base station 5 shown in FIG. 2. As shown, the base station 5 has a transceiver circuit 51 for transmitting signals to and for receiving signals from the communication devices (such as UE 3) via one or more antenna 53, and at least one network interface 55 for transmitting signals to and for receiving signals from the NR core network (and/or other networks such as the evolved packet core (EPC).

The base station 5 has a controller 57 to control the operation of the base station 5. The controller 57 is associated with a memory 59. Although not necessarily shown in FIG. 7, the base station 5 will of course have all the usual functionality of an NR gNB and this may be provided by any one or any combination of hardware, software and firmware, as appropriate. Software may be pre-installed in the memory 59 and/or may be downloaded via the communications network 1 or from a removable data storage device (RMD), for example.

The controller 57 is configured to control the overall operation of the base station 5 by, in this example, program instructions or software instructions stored within memory 59. As shown, these software instructions include, among other things, an operating system 61, a communications control module 63, a control data module 64, a user module 65, a slot structure configuration module 67 and an LBT module 69.

The communications control module 63 controls the overall communication between the base station 5 and the UE.

The control data module 64 manages the encoding and transmission of DL control data transmitted by the base station 5 to the UE 3 (for example control data transmitted on the PDCCH, GC-PDCCH and/or other similar control channels such as the E-PDCCH/M-PDCCH). The control data module 64 also manages the monitoring for, and the reception and decoding of UL control data at the base station 5 (e.g. ACK/NACK signalling on the PUCCH and/or RACH related signaling during PRACH procedures).

The user data module 65 manages the encoding and transmission of DL user data transmitted by the base station 5 to the UE 3 (for example user data transmitted on the PDSCH or the Ike). The user data module 65 also manages the reception and decoding of UL user data at the base station 5 (e.g. user data transmitted on the PUSCH or the like).

The slot structure configuration module 67 is responsible for configuring and reconfiguring the slot structure within a shared COT during the MCOT and for generating, dynamically, the slot structure indications corresponding to the configured slot structure (e.g. the slot structure indication bitmaps provided in the GC-PDCCH). The slot structure configuration module 67 informs the control data module 63 when the slot structure changes and provides an updated slot structure indication (e.g. bitmap) accordingly to allow the control data module 63 to notify the UE 3 of the updated slot structure configuration.

The LBT module 69 manages the performance, at the base station 5, of clear channel assessment (CCA)/channel sensing (CS) necessitated by LBT requirements.

Flexible PDSCH Starting Position

Figure 8:
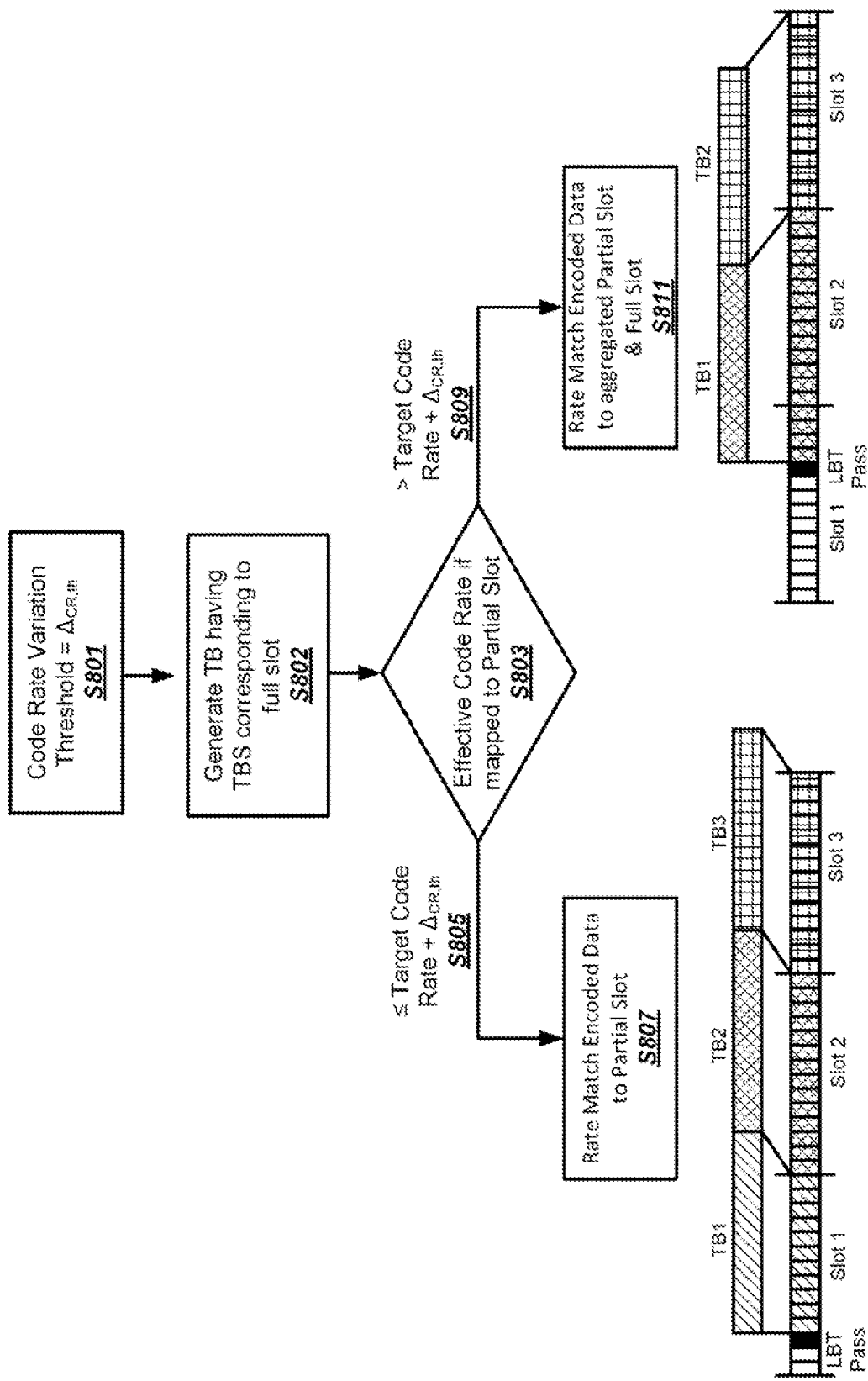
FIG. 8 is a simplified flow chart illustrating a mechanism for supporting a flexible PDSCH starting position in the context of NR-U.

FIG. 8 is a flow chart illustrating a mechanism which may be performed at the base station 5 for supporting a flexible PDSCH starting position in the context of NR-U.

As seen in FIG. 8, at S801, a code rate variation threshold ($\Delta_{CR,th}$) is configured in the base station 5. The code rate variation threshold may be determined in any of a number of different ways. For example, it may be pre-configured at the base station, or calculated/re-configured at the base station dynamically 'on the fly'. For example it may be reconfigured based on a statistical average of received signal-to-noise ratio (SNR) at the base station over a period of time.

When the base station 5 obtains, by means of LBT, a TXOP, the base station generates, at S802, a transport block for transmission on a corresponding PDSCH. The transport block is generated with a size that corresponds to a full slot length regardless of when the TXOP occurs in a given slot.

When the TXOP occurs part way through a slot, the base station 5 determines, at S803, the effective code rate that would arise if the generated transport block were rate matched to the remaining partial slot. The base station 5 performs a comparison of this effective code rate with a target code rate (effectively the code rate that would be expected if a full slot were available) when added to the code rate variation threshold (i.e. Target Code Rate+$\Delta_{CR,th}$).

[Math. 3]

If the comparison results in a finding that the effective code rate is no greater than the target code rate when added to the code rate variation threshold (i.e. ≤Target Code Rate+$\Delta_{CR,th}$) as seen at S805, then the encoded data in the transport block is rate matched to the resources (symbols) of the partial slot at S807.

If, on the other hand, the comparison results in a finding that the effective code rate is greater than the target code rate when added to the code rate variation threshold (i.e. >Target Code Rate+$\Delta_{CR,th}$) as seen at S809, then the encoded data in the transport block is rate matched, at S807, to the resources (symbols) of the partial slot when aggregated with the subsequent (full) slot.

It can be seen, therefore, that when LBT results in a TXOP that is part way through a slot, a TB is generated that has a size corresponding to a full slot but when the TB it is either rate matched to fewer symbols than a full slot (e.g. the symbols of the remaining partial slot) or to a larger number of symbols than a full slot (e.g. the symbols of the remaining partial slot aggregated with all the symbols of the subsequent full slot).

Dynamic UL/DL Slot Structure Indication

Figure 9:
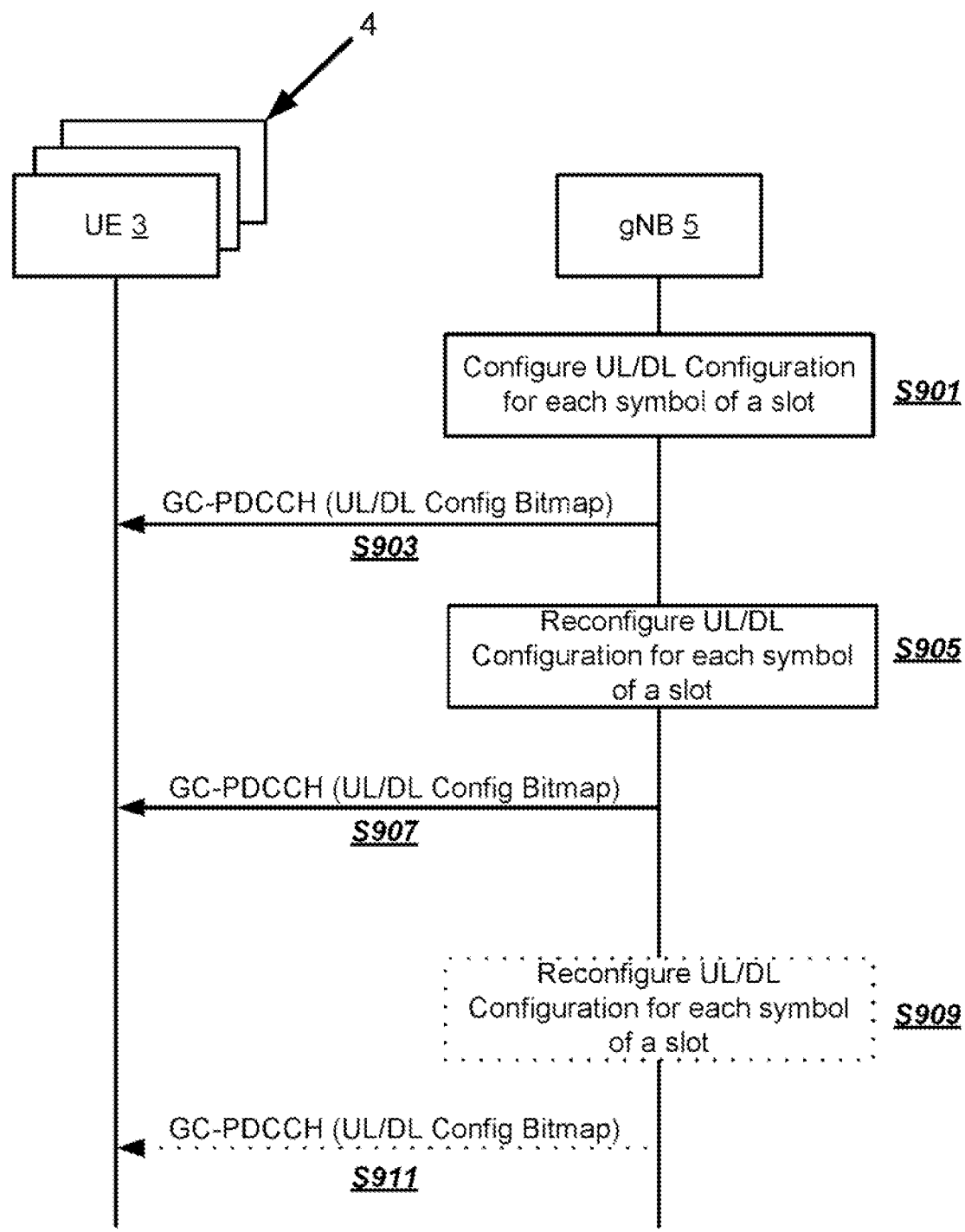
FIG. 9 is a simplified message sequence diagram illustrating a mechanism for providing a dynamic UL/DL slot structure indication.

FIG. 9 is a message sequence diagram illustrating a mechanism for providing a dynamic UL/DL slot structure indication to a UE 3.

As seen in FIG. 9, when the base station 5 is uses a COT that is shared between the UL and the DL, it configures the UL/DL slot structure at a symbol level of granularity at S901. The base station 5 generates an associated bitmap in which each bit represents the UL or DL configuration for a respective symbol of the slots (e.g. 1=UL, 0=DL or vice versa) in the shared COT for the duration of MCOT. The base station 5 then sends, at S903, the bitmap to a group 4 comprising one or more UEs 3 using a GC-PDCCH.

When the UL/DL slot configuration requires changing, the base station 5 reconfigures the UL/DL slot configuration at S905, generates an updated bitmap, and sends the updated bitmap to the group 4 of one or more UEs 3 on a GC-PDCCH. The procedure is repeated dynamically each time the UL/DL slot configuration requires changing (as shown at S909 and S911).

Modifications and Alternatives

Detailed example embodiments have been described above. As those skilled in the art will appreciate, a number of modifications and alternatives can be made to the above example embodiments whilst still benefiting from the inventions embodied therein. By way of illustration only a number of these alternatives and modifications will now be described.

It will be appreciated that, whilst a communication system has been described in which a number of beneficial features are implemented, the features need not all be implemented. For example, the system would still provide advantage if only the mechanism for supporting a flexible PDSCH starting position were implemented, if only the mechanism for providing a dynamic UL/DL slot structure indication, or if only one the other beneficial features were implemented.

Moreover, an alternative possible approach to using an initial/wakeup signal to identify the start of downlink transmission in NR-U, would be to perform frequent CORESET monitoring to detect a leading PDCCH during a downlink COT with a reduced (limited) search space. Then, after detection of the beginning of downlink transmission, the UE can switch to less frequent but more complicated PDCCH monitoring. However whilst this alternative approach has the advantage of reduced complexity compared to blind decoding the approach of using an initial/wakeup signal employed in the example has the potential to allow an even greater reduction in UE complexity.

It will be appreciated that, whilst indicating the UL/DL configuration only when the configuration is changed is particularly beneficial, the dynamic indication could be performed periodically (e.g. regardless of whether there has been a change in configuration). The indication could, for example, be provided at the beginning of the MCOT, or multiple times per MCOT (e.g. every few slots, at the beginning of each slot or the Ike). Provision, of the MCOT structure indication every several slots enables updating/varying the configuration more frequently if needed. It will also be appreciated that for such a periodic indication, the periodicity of MCOT structure indication need not be fixed and may be configurable. The provision of a periodic indication can mitigate the risk of a UE not receiving an update to a configuration (albeit at the expense of additional control signal overhead).

It will also be appreciated that the base station could be reconfigurable to provide either a periodic indication or a change triggered indication depending on requirements.

It will be appreciated that there are several other options for indicating the UL/DL slot structure within the MCOT besides using a bitmap. For example, an implicit indication could be provided by means of a DL/UL scheduling downlink control information (DC) format. However, this allows the configuration of fixed slot formats (either DL centric or UL centric) only and so does not allow the flexibility to dynamically configure UL and DL resource ratios within a slot.

Another option for providing an indication of the UL/DL slot configuration is to provide a slot format indicator (SF) in the GC-PDCCH. On the face of it, this appears to be a relatively straightforward indication mechanism because SFI is already supported in the NR Release 15 standards to enable a flexible frame structure and so can, hypothetically, be introduced for NR-U to indicate the slot structure of the MCOT relatively easily. However, whilst using an SFI appears to have the flexibility to indicate the transmission direction (UL/DL) of each symbol in a slot, this mechanism would require a set of formats (potentially a large number) at the UEs and so may not be suitable.

[Math. 4]

It will be appreciated that the inequality used, in the procedure described with reference to branch S805 of FIG. 8 (i.e. whether the effective code rate is no greater than the target code rate when added to the code rate variation threshold) may simply be whether the effective code rate is less than the target code rate when added to the code rate variation threshold (i.e. <Target Code Rate+$\Delta_{CR,th}$). Similarly, branch S809 may be based on whether the effective code rate is no less than the target code rate (i.e. ≥Target Code Rate+$\Delta_{CR,th}$).

Other options for providing for providing an indication of the UL/DL slot configuration include provision of a separate field in DL burst identification signal or the use of a dedicated preamble for indicating the slot structure.

In the above example embodiments, a number of software modules were described. As those skilled in the art will appreciate, the software modules may be provided in compiled or un-compiled form and may be supplied to the apparatus in question (UE, RAN, eNB, gNB etc.) as a signal over a computer network, or on a recording medium. Further, the functionality performed by part or all of this software may be performed using one or more dedicated hardware circuits. However, the use of software modules is preferred as it facilitates the updating of the base station or the mobile device in order to update their functionalities.

Each controller forming part of an apparatus described herein may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

The base station may comprise a 'distributed' base station having a central unit 'CU' and one or more separate distributed units (DUs).

Whilst the base station and UEs have been described as a 5G base station (gNB) and corresponding UEs it will be appreciated that the features described above may be applied to the gNBs and UEs of LTE/LTE-Advanced and other communications technologies.

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the Ike, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine-type communication applications.

TABLE 3

| Service Area | MTC applications |
| --- | --- |
| Security | Surveillance systems |
| | Backup for landline |
| | Control for physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |

TABLE 3-continued

| Service Area | MTC applications |
| --- | --- |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/ Control | Sensors |
| | Lighting |
| | Pumps |
| | Valves |
| | Elevator control |
| | Vending machine control |
| | Vehicle diagnastics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and example embodiments described in the present document. Needless to say, these technical ideas and example embodiments are not limited to the above-described UE and various modifications can be made thereto.

Various other modifications will be apparent to those skilled in the art and will not be described in further detail here.

This application is based upon and claims the benefit of priority from United Kingdom Patent Application No. 1815910.3, filed on Sep. 28, 2018, the disclosure of which is incorporated herein in its entirety by reference.

What is claimed is:

1. A method performed by a base station, the method comprising:
    performing a listen-before-talk (LBT) procedure for gaining access to unlicensed spectrum;
    in a case where the base station gains access to the unlicensed spectrum during a current slot, transmitting data of a transport block (TB) including data for transmission to a user equipment (UE), based on an effective code rate at which the TB is rate matched to remaining symbols in the current clot,
    wherein:

the data of the TB is transmitted along using a first set of symbols in a case where the effective code rate meets a criterion;

the data of the TB is transmitted using a second set of symbols that is different from the first set of symbols where the effective code rate does not meet the criterion; and determination of whether the effective code rate meets the criterion is based on a comparison of the effective code rate with a target code rate.

2. The method according to claim 1, wherein one of the first set of symbols and the second set of symbols comprises remaining symbols of the current slot, and another one of the first set of symbols and the second set of symbols comprises an aggregation of both the remaining symbols of the current slot and all the symbols of a subsequent slot.

3. The method according to claim 1, wherein the TB is prepared to have a TBS that corresponds to all the symbols of a full sized slot.

4. The method according to claim 1, wherein the TB is prepared to have a TBS that corresponds to the symbols of one of a partial slot and a mini-slot, the partial slot and the mini-slot comprising a predetermined number of symbols of a full sized slot.

5. The method according to claim 1, wherein the comparison is a comparison of the effective code rate with a sum of the target code rate and a threshold.

6. The method according to claim 5, wherein the determination of whether the effective code rate meets the criterion is based on whether the effective code rate is not greater than the sum of the target code rate and the threshold.

7. The method according to claim 5, wherein the determination of whether the effective code rate meets the criterion is based on whether the effective code rate is not less than the sum of the target code rate and the threshold.

8. The method according to claim 5, wherein the threshold is a code rate variation threshold.

9. The method according to claim 5, wherein the threshold is pre-configured at the base station.

10. The method according to claim 5, wherein the threshold is calculated at the base station dynamically when required.

11. The method according to claim 5, wherein the threshold is calculated based on a statistical average of a received signal-to-noise ratio (SNR) at the base station over a period of time.

12. A base station comprising:

at least one memory storing instructions; and at least one processor configured to process the instructions to:

perform a listen-before-talk (LBT) procedure for gaining access to unlicensed spectrum;

in a case where the base station gains access to the unlicensed spectrum during a current slot, transmit data of a transport block (TB) including data for transmission to a user equipment (UE), based on an effective code rate at which the TB is rate matched to remaining symbols in the current slot;

wherein the data of the TB is transmitted using a first set of symbols in a case where the effective code rate meets a criterion, the data of the TB is transmitted using second set of symbols that is different from the first set of symbols otherwise, and determination of whether the effective code rate meets the criterion is based on a comparison of the effective code rate with a target code rate.

* * * * *